United States Patent [19]

Murayama et al.

[11] Patent Number: 5,112,578
[45] Date of Patent: May 12, 1992

[54] REACTOR FOR REFORMING HYDROCARBON AND PROCESS FOR REFORMING HYDROCARBON

[75] Inventors: Katsutoshi Murayama; Masatoshi Yamaguchi; Tooru Nakamura, all of Niigata, Japan

[73] Assignee: Mitsubishi Gas Chemical Company, Inc., Tokyo, Japan

[21] Appl. No.: 336,905

[22] Filed: Apr. 12, 1989

[30] Foreign Application Priority Data

Apr. 12, 1988 [JP] Japan .................. 63-88248

[51] Int. Cl.⁵ .................... B01J 8/06
[52] U.S. Cl. ................. 422/197; 48/198.7; 252/373; 422/190; 422/196; 422/211
[58] Field of Search ............. 422/190, 191, 192, 196, 422/197, 211; 48/198.7; 252/373

[56] References Cited

U.S. PATENT DOCUMENTS

| Re. 24,311 | 5/1957 | Mader ................ 422/197 X |
| 4,741,885 | 5/1988 | Herbort et al. ........... 422/197 |

FOREIGN PATENT DOCUMENTS

| 21604/83 | 6/1984 | Australia . |
| 1076361 | 11/1977 | Canada . |
| 53-82691 | 7/1978 | Japan . |
| 59-107901 | 6/1984 | Japan . |
| 986090 | 3/1965 | United Kingdom . |
| 1047627 | 11/1966 | United Kingdom . |
| 2153382 | 8/1985 | United Kingdom . |

*Primary Examiner*—Robert J. Warden
*Assistant Examiner*—Amahlia Santiago
*Attorney, Agent, or Firm*—Wenderoth, Lind & Ponack

[57] ABSTRACT

A hydrocarbon-reforming reactor by a steam reforming reaction and a partial oxidation reaction, which comprises a chamber for feeding oxygen-containing gas, a chamber for feeding a mixture gas of hydrocarbon with steam and a chamber for heat exchange of reformed gas in this order from one side of the reforming reactor, and which further comprises a catalyst layer filled in a space between an inner tube having an opening to the chamber for feeding oxygen-containing gas and a reaction tube being so placed as to position the inner tube in its middle portion and having an opening to the chamber for feeding the mixture gas, and a process for producing reformed gas from hydrocarbon which comprises carrying out a steam reforming reaction in the catalyst layer on the side of the chamber for feeding the mixture gas of hydrocarbon with steam by feeding the mixture gas of hydrocarbon with steam to the catalyst layer from the chamber for feeding the mixture gas, carrying out a partial oxidation reaction and steam reforming reaction by feeding oxygen-containing gas fed into the inner tube through the chamber for feeding oxygen-containing gas to the catalyst layer through holes or slits provided in that part of the inner tube which is located opposite to the chamber for feeding the mixture gas, and allowing the resultant, reformed gas to move out of the reforming reactor from the reaction tube through the chamber for heat exchange of reformed gas.

6 Claims, 1 Drawing Sheet

REACTOR FOR REFORMING HYDROCARBON AND PROCESS FOR REFORMING HYDROCARBON

FIELD OF THE INVENTION

This invention relates to a reactor for producing reformed gas from hydrocarbon by a reforming reaction with steam and partial oxidation and a process for the reforming reaction.

Reformed gas obtained from hydrocarbon containing hydrogen and hydrocarbon oxides ($CO+CO_2$) as main components is used in many industries using hydrogen, i e., reformed gas is used as a gas for synthesis of ammonia and methanol, as hydrogenated gas for various chemical reactions, as city gas, as gas for fuel battery, and the like.

DESCRIPTION OF THE PRIOR ART

Reformed hydrocarbon is produced mainly by the following two reforming processes.

(1) Steam reforming process

A mixture gas of hydrocarbon with steam is subjected to the following reformation with steam at 5 to 40 atms and 700° to 900° C. by heating a catalyst-filled reaction tube in a combustion heating furnace.

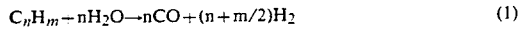  (1)

  (2)

The above process makes it possible to effectively obtain hydrogen, etc., from hydrocarbon by using steam recovered in an apparatus as a material.

(2) Partial oxidation process

An oxygen-containing gas is introduced into a mixture gas of hydrocarbon with steam to combust a part of the hydrocarbon, and the steam reforming reaction is carried out by heat generated from the combustion.

The above process requires no external heating, and is therefore carried out in a pressure vessel having a simple structure. A catalyst is sometimes used, and sometimes not. A reactor for this process uses a lining of a heat-resistant material, and the reaction is carried out at high temperature and high pressure. The yield of carbon oxides ($CO+CO_2$) by this process is generally larger than that obtained by the steam reforming process.

Further, the reforming reaction is also carried out by a combination of the above two processes.

For example, in an apparatus for producing ammonia, at first, hydrocarbon is reformed according to a steam reforming process and then an air is introduced to the resultant reformed gas to carry out a partial oxidation reaction, whereby a reformed gas having a hydrogen/nitrogen molar ratio of 3/1 is obtained.

Canada Patent No. 1076361 also describes a process for obtaining a reformed gas having a composition suitable for methanol synthesis by combining a steam reforming process and a partial oxidation process.

Further, Japanese Laid-Open Patent Publication No. 82691/1978 describes a process for heating a reaction tube of heat-exchanger type for steam reformation by using a reformed gas coming from a reactor for partial oxidation and having a higher temperature. Australia Patent No. 8321604 describes a process which comprises carrying out a steam reforming reaction in a catalyst-filled reaction tube within a reactor, then carrying out a partial oxidation reaction and heating the catalyst-filled reaction tube with the resultant gas.

In the steam reforming process, a reaction tube is heated uniformly by a combustion gas having a high temperature of about 1,000° C. However, a reforming furnace can give a heat efficiency of only 50 to 55%. Therefore, the steam reforming process requires the use of a large amount of a fuel and high costs for heat-recovery equipment. Further, in order to heat a catalyst uniformly, it is necessary to provide many reaction tubes and burners. Therefore, the size of a reforming furnace increases and the uniform heating of the reaction tubes is rendered difficult. So, the capacity of the plant is limited.

The partial oxidation reaction is carried out within a simply structured pressure container under high pressure. Therefore, neither expensive reaction tubes nor complicated burners are necessary, and its heat loss is small. Since, however, a combustion gas is included in a reformed gas, it is necessary to use high purity oxygen for the combustion except for the case of an apparatus for producing ammonia in which nitrogen is used as a material.

For the above reason, a device for separating oxygen from an air is necessary and therefore, the costs for construction of the device and required power are large. Further, since hydrogen is combusted in the partial oxidation reaction, the hydrogen concentration in the reformed gas is low, and the concentrations of carbon oxides ($CO+CO_2$) are high.

In a process using a combination of a steam reforming process and a partial oxidation process, it is possible to obtain a reformed gas suitable for reactions using hydrogen and carbon oxides ($CO+CO_2$) as materials, such as a reaction for producing methanol. Further, in this combination process, the problems of the above two processes are mutually reduced. However, the combination process of prior art has the following problems.

First, Canada Patent No. 1076361 describes an apparatus for producing methanol, which is a combination, in the same way as in an apparatus for producing methanol, of a primary reformation furnace according to the steam reforming process and a secondary reforming furnace according to the partial oxidation process. This apparatus requires a device for separating oxygen from an air, expensive reaction tubes and a heat recovery device. Therefore, its construction costs increase and the improvement in heat efficiency is also small.

Japanese Laid-Open Patent Publication No. 82691/1978 describes a process in which reaction tubes for steam reformation are provided within a pressure vessel and heated by a partial oxidation gas at high temperatures. Hence, the heat efficiency is improved. In this process, the stress by the elongation of the reaction tubes due to being heated is absorbed by bending small tubes. Since, however, many small tubes are provided within a pressure vessel, it is considerably difficult to manufacture an apparatus in which many reaction tubes are provided, and it is impossible to check or repair the small tubes after the apparatus is manufactured. It is also difficult to replace reaction tubes. The small tubes form that portion of the apparatus which gas at high temperatures is in contact with, and said portion is where troubles are most likely to occur.

Australia Patent No. 8321.604 solves the above problem of the damage of reaction tubes by elongation. However, after the steam reforming reaction is carried out in the reaction tubes, the partial oxidation reaction is carried out by contacting the resultant reaction gas to oxygen gas. Therefore, the temperature in this gas contact portion goes very high, and there is a risk of causing breakage of reaction tubes and forming free carbon.

SUMMARY OF THE INVENTION

It is an object of this invention to provide an easily maintainable reactor for reforming hydrocarbon which uses a combination of a steam reforming process and a partial oxidation reaction, and an operationally easily maintainable process for reforming hydrocarbon.

It is another object of this invention to provide a reactor and process for reforming hydrocarbon which can reduce breakage of, and leakage from, reaction tubes to prevent risk of combusion explosion when the breakage and leakage occur, by bringing a reaction tube into contact with partially oxidized, reformed gas to proceed with a steam reforming reaction, instead of using combustion gas at a high temperature to heat the reaction tube.

It is another object of this invention to provide a reactor and process for reforming hydrocarbon which can reduce the amount of oxygen to be used for partial oxidation by directly providing a steam reforming reaction with heat generated in the partial oxidation.

It is further another object of this invention to provide a reactor for reforming hydrocarbon of which the heat loss is small and of which the energy consumption unit can be reduced as compared with conventional steam reforming furnace, and a process for reforming hydrocarbon which is excellent in heat efficiency.

It is yet another object of this invention to provide a reactor for reforming hydrocarbon which can be easily enlarged in size as compared with conventional steam reforming furnace, and a process for reforming hydrocarbon which permits production in a giant capacity.

This invention provides a reactor for reforming hydrocarbon by a steam reforming reaction and a partial oxidation reaction, which comprises:

a. two tube sheets consisting of a first tube sheet and a second tube sheet on one side of a vertical reforming reactor, said first tube sheet together with a wall of the reforming reactor forming a chamber for feeding an oxygen-containing gas, said first and second tube sheets together with the wall of the reforming reactor forming a chamber for feeding a mixture gas of hydrocarbon with steam, said second tube sheet together with the wall of the reforming reactor forming a chamber for heat exchange chamber of reformed gas, b. at least one inner tube having an opening to the chamber for feeding oxygen-containing gas and extending within the chamber for heat exchange of reformed gas, the inner tube being placed through the first tube sheet, c. a reaction tube having an opening to the chamber for feeding a mixture gas and extending within the chamber for heat exchange of reformed gas such that the reaction tube surrounds the inner tube, the reaction tube being placed through the second tube sheet, the inner tube having a smaller length than the reaction tube in the chamber for heat exchange of reformed gas and having holes or slits to feed oxygen-containing gas in its part on the end portion side of the inner tube positioned in the chamber for heat exchange of reformed gas, d. a catalyst being filled in a space between the inner tube and the reaction tube and between the inner tube and a catalyst support, the catalyst being supported by a catalyst support positioned in the end portion of the reaction tube in the chamber for heat exchange of reformed gas, the catalyst support permitting reformed gas to pass therethrough, and e. a feed nozzle of the oxygen-containing gas being provided to the chamber for feeding said gas, a feed nozzle of the mixture gas being provided to the chamber for feeding said gas, and outlet nozzle of reformed gas being provided to the chamber for heat-exchange of reformed gas.

Further, this invention provides a process for producing reformed gas from hydrocarbon by using a reactor for reforming hydrocarbon which comprises a chamber for feeding oxygen-containing gas, a chamber for feeding a mixture gas of hydrocarbon with steam and a chamber for heat exchange of reformed gas in this order from one side of the reforming reactor, and which further comprises a catalyst layer filled in a space between an inner tube having an opening to the chamber for feeding oxygen-containing gas and a reaction tube being so placed as to position the inner tube in its middle portion and having an opening to the chamber for feeding the mixture gas, said process comprising carrying out a steam reforming reaction in the catalyst layer on the side of the chamber for feeding the mixture gas of hydrocarbon with steam by feeding the mixture gas of hydrocarbon with steam to the catalyst layer from the chamber for feeding the mixture gas, carrying out a partial oxidation reaction and steam reforming reaction by feeding oxygen-containing gas fed into the inner tube through the chamber for feeding oxygen-containing gas to the catalyst layer through holes or slits provided in that part of the inner tube which is located opposite to the chamber for feeding the mixture gas, and allowing the resultant, reformed gas to move out of the reforming reactor from the reaction tube through the chamber for heat exchange of reformed gas.

DETAILED DESCRIPTION OF THE INVENTION

Figure 1:
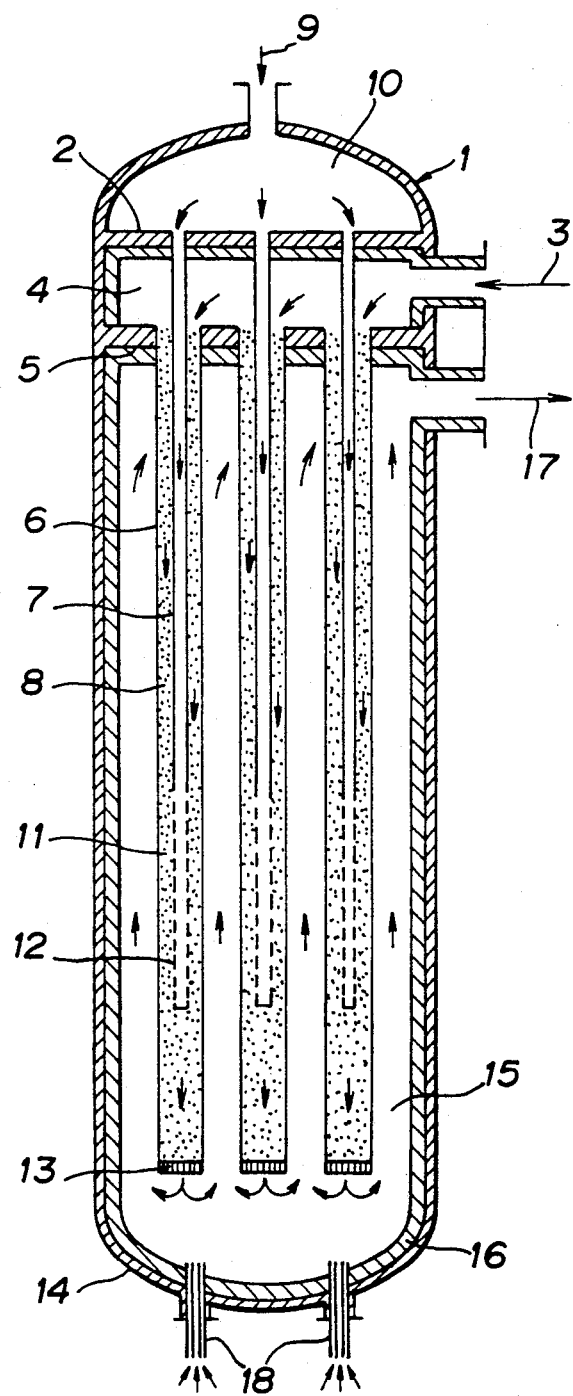
FIG. 1 shows a schematic cross-sectional view of a hydrocarbon-reforming reactor of this invention.

The present inventors have made diligent studies of hydrocarbon-reforming reactors and processes having the aforementioned problems, and consequently found an optimal reactor and process which is a combination of a steam reforming process and a partial oxidation process, in which the problems of formation of free carbon, etc., and the damage of a reaction tube by elongation at high temperature can be removed by providing an inner tube inside a catalyst-using reaction tube placed within a reactor and introducing oxygen-containing gas into the end portion of the catalyst-using reaction tube through the inner tube. The "oxygen-containing gas" in this invention stands for oxygen, gas enriched with oxygen or an air.

The reforming reactor and process of this invention will be explained hereinbelow according to the drawings.

FIG. 1 shows a structure of a vertical hydrocarbon-reforming reactor of this invention of which the upper portion is provided with a chamber for feeding oxygen-containing gas and of which the lower portion is provided with a burner for start-up. In FIG. 1, the vertical cylindrical reforming reactor has two tube sheets (2 and 5) in its upper portion, an inner tube 7 having many small holes in its lower portion and being vertically suspended from the first tube sheet 2 and a reaction tube 6 having a catalyst filled in the space inside thereof and outside the inner tube and being vertically suspended from the second tube sheet 5. In view of the uniform heating of the reaction tube, the circular shape is the most preferable. The mixture gas of hydrocarbon with steam is introduced through a feed nozzle 3 of mixture gas into a chamber 4 for feeding mixture gas and then to a catalyst layer 8 filled in the space between the reaction tube 6 and the inner tube 7 to carry out a steam reforming reaction. And the oxygen-containing gas is introduced through a feed nozzle 9 of oxygen-containing gas into a chamber 10 for feeding oxygen-containing gas and, through the inner tube 7, into the lower portion of the catalyst layer to carry out a partial oxidation reaction in the lower portion of the catalyst layer. Reformed gas after the partial oxidation heats the reaction tube as it moves upward along a chamber 15 for heat-exchange of reformed gas positioned outside the reaction tube, and comes out of an outlet port 17 of reformed gas.

In addition, the bottom portion of the reforming reactor is provided with a heating burner for start-up of the reforming reactor, and when the operation is started, a fuel and oxygen-containing gas are fed to the burner and combusted to heat the reaction tube.

The steam reforming reaction in the upper portion of the catalyst layer is carried out at a temperature between 600° and 800° C. Therefore, it is desirable to preheat the mixture gas of hydrocarbon with steam at a temperature between 400° and 600° C. before introducing it from the inlet port of mixture gas.

In addition, the mixture gas of hydrocarbon with steam may contain a purged gas from a methanol or ammonia synthesis apparatus or a carbonic acid gas in order to adjust the composition of reformed gas or recover hydrogen. In the chamber 4 between the tube sheets for feeding mixture gas, it is desirable to provide heat-insulating material to portions adjacent to the shell and the first tube sheet 2 in order to prevent mixture gas from radiating heat.

Nickel-type catalysts are usually used as a catalyst for a hydrocarbon-reforming reaction. Since this reaction is an endothermic reaction, the reaction proceeds while being provided with heat from reformed gas outside the reaction tube. Since the temperature of mixture gas in the upper zone of the catalyst layer decreases, it is desirable to fill the upper zone with a high activity catalyst reacting at a relatively low temperature. When the reaction amount in this zone for the steam reforming reaction is large, the reaction amount in the subsequent partial oxidation reaction zone decreases. It is preferable to select a heat transmission zone of a reaction tube, a catalyst amount and a type of catalyst such that the reaction amount in the zone is made as large as possible.

Oxygen-containing gas introduced through the inlet nozzle 9 of oxygen-containing gas is directed to the lower zone of the catalyst layer through the inner tube 7 to carry out a partial oxidation reaction in the lower zone of the catalyst layer. The oxygen-containing gas gets included in reformed gas after used in the partial oxidation reaction, and consequently inactive components contained in the oxygen-containing gas is included in reformed gas. Desirably, therefore, the oxygen-containing gas is of high purity as much as possible except for the use of inactive components (nitrogen) for a reaction such as synthesis of ammonia. A pure oxygen gas, air or gas enriched with oxygen is used depending on its application. Oxygen-containing gas passing through the inner tube 7 is not only likely to take heat from the catalyst layer on its outer side to cool the catalyst layer 8 but also has oxidation damage on the inner tube. Therefore, it is desirable to make the inner tube 7 as small as possible, and it is also desirable to use a heat-resistant heat-insulating material such as ceramic in the inner surface and/or outer surface of the inner tube. The oxygen-containing gas is released to the catalyst layer 11 through the small holes or slits made in the end portion of the inner tube. The end portion of the inner tube is provided with a dispersion portion 12 having many small holes or slits to disperse oxygen-containing gas widely therethrough. By dispersing oxygen-containing gas widely, the combustion reaction is carried out moderately and the extreme increase of temperature is prevented to prevent breakage of the reaction tube, inner tube and catalyst. In this partial oxidation zone, not only a combustion reaction but also a steam reforming reaction are carried out. It is therefore desirable to use a catalyst having high heat resistance.

In this invention, the length of the reaction tube within the chamber for heat exchange of reformed gas is made larger than the length of the inner tube, which enhances the reforming reaction and makes it possible to obtain a nearly equilibrium composition.

The lowest portion of the reaction tube is provided with a catalyst support 13 through which gas flows out. Reformed gas at 850° to 1,100° C. is released into the chamber for heat exchange of reformed gas through the catalyst support 13. The chamber for heat exchange of reformed gas consists of a pressure-resistant wall and a heat insulating material, and in its bottom portion, reformed gas released from each of the reaction tubes changes its moving direction and goes upward as the reformed gas provides the reaction tubes with heat. In order to enhance this heat transfer efficiency, a baffle plate may be provided on the shell side of the reactor. The reformed gas going upward has a temperature lower to some extent than the surface temperature of the reaction tube in the partial oxidation zone and has an effect of cooling the surface of the reaction tube in said zone. In the steam reforming zone at low temperature in the upper portion of the reaction tube, the reformed gas decreases its temperature by providing the reaction tube with heat and comes out through the outlet nozzle 17 of reformed gas. In heat recovery in the steam reforming zone at low temperature, desirably, the temperature of reformed gas decreases by not less than 200° C., and not less than 20% of hydrocarbon as material is reformed.

With regard to reaction conditions for the reforming reactor and reforming reaction process of this invention, in general, the pressure is between 10 and 150 atm, preferably between 30 and 100 atm, and the temperature at outlet portion of the reaction tube is between 850° and 1,050° C., preferably between 900° and 1,000° C. Mixture gas being fed to the catalyst layer has a space velocity of between 2,000 to 8,000 l/hr and linear velocity of between 0.5 and 2.0 m/sec.

In the steam reforming zone at low temperature in the upper portion of the catalyst layer, desirably, not less than 15%, preferably 20 to 30%, of hydrocarbon as material is reformed. In addition, the reformed ratio of hydrocarbon as material is represented by [1.0-(hydrocarbon ($CH_4$) content in reformed gas (mole))/(carbon content (mole) in hydrocarbon as material]×100 (%). Accordingly, the heat recovery is effected such that the temperature of reformed gas from the outlet of the reactor is lower than that of the reformed gas in the outlet portion of the reaction tube by 200° to 400° C. and reaches a temperature higher than the temperature of mixture gas to be fed to the reactor by about 50° to 150° C.

In one example of reformed gases obtained under the above conditions, when reformed gas for producing methanol is produced by using natural gas containing methane as a main component, the composition of the resultant reformed gas is that the hydrogen/carbon oxides stoichiometry ratio is 1:00–1.06 and the $CH_4$ content is not more than 3 mol %. Thus, the resultant composition is optimal for synthesis of methanol.

The reaction tube of this invention, in general, has an inner diameter of 50 to 125 mm and a length of 10 to 20 m. Examples of the material for the reaction tube include nickel, chromium, molybdenum steel, or that which obtained by incorporating thereto a small amount of niobium, tungsten, etc. The inner tube usually has a diameter of 10 to 30 mm, and that portion of the inner tube which includes the dispersion portion has a length within the reaction tube shorter than that of the reaction tube by 10 to 20%. The size of the small holes or slits made in the dispersion portion of the inner tube can be selected from such a range as to prevent catalyst particles from entering the inner tube. The material for the inner tube can be selected from those for the reaction tube, and, desirably, the inner and outer surface of the inner tube is provided with a heat-resistant heat-insulating material such as ceramic as mentioned above. In a working embodiment shown in FIG. 1, it is not necessary to fix the bottom portion of the reaction tube. However, when the chamber for feeding oxygen-containing gas is placed in the lower portion of a reforming reactor and a burner for actuation is mounted on the upper portion of the reforming reactor, it is desirable to provide a supporting member to fix the upper portion of the reaction tube to the wall of the reactor. Additionally, in general, nickel-type catalysts are used for reforming hydrocarbon.

The hydrocarbon-reforming reactor of this invention solves the problem of prior art as follows.

The steam reforming process of prior art requires an externally heating reforming furnace of large scale, and the apparatus for producing ammonia of prior art requires the use of two reforming furnaces for externally heating reforming and internally heating partial oxidation. In contrast thereto, the reforming reactor and process of this invention make it possible to carry out the reformation by one internally heating reforming furnace. Since the reforming reaction in the internally heating reforming furnace is carried out under high pressure, the reforming reactor can be made very small in scale and the construction costs thereof can therefore be decreased. Accordingly, the production costs are also decreased.

In the reforming reactor and process of this invention, reformed gas after the partial oxidation reaction works as medium to heat the reaction tube. For this reason, the pressure difference between the reaction tube and the heating medium is small, and the wall thickness of the reaction tube is rendered small. The reaction tube requires the use, as its material, of a high heat-resistance, expensive material such as nickel, chromiumm, molybdenum, niobium and the like. Therefore, if the wall thickness of the reaction tube can be reduced, the costs for manufacturing the apparatus are reduced, and accordingly the costs for producing reformed gas are reduced.

In the reforming reactor of this invention, any special means is not required to solve the damage caused on reaction tubes by the heat strain due to the combustion gas at high temperature, since the reaction tube is linear and has its end opened in the heat exchange chamber of reformed gas.

In the conventional steam reforming process, the medium for heating the reaction tube is combustion gas at high temperature. Hence, there is a risk of an explosion when breakage of, and leakage from, the reaction tube happen, whereas in the reforming reactor and process of this invention, the risk when the reaction tube breaks or leaks is very small since reformed gas is medium to heat the reaction tube.

In the reforming reactor and process of this invention, heat generated from the partial oxidation is used directly for the steam reforming reaction. Therefore, the amount of oxygen to be used for the partial oxidation is reduced. Further, the composition of reformed gas is adjusted by the partial oxidation reaction, and therefore it is possible to obtain reformed gas suitable for various synthesis such as synthesis of methanol, synthesis of ammonia, and the like.

The reforming reactor of this invention is of an internal heating type, and can be reduced in scale. Therefore, the heat loss by radiation is small, and the energy consumption unit is improved as compared with the steam reforming furnace of prior art. Further, a reforming process having excellent heat efficiency is also provided. And since the reforming reactor of this invention is small in scale and simple in structure, its design and manufacture are easy, it is easily possible to increase the scale of its apparatus as compared with the conventional steam reforming furnace, and there is provided a reforming process which permits production in a giant capacity.

EXAMPLE 1

A gas for production of methanol was produced from natural gas and purged gas from a synthesis apparatus of methanol by using a hydrocarbon-reforming reactor of this invention. The main conditions for operating the reforming reactor were as follows. (The compositions of gases stand for mol %.)

| (1) Mixture gas as material | |
|---|---|
| Feeding pressure | 54.5 kg/cm$^2$ A |
| Feeding temperature | 550° C. |
| Feeding amounts | |
| Natural gas | 2,560 kg-mole/hr |
| ($CH_4$ 89%, $C_2H_6$ 8.5%, $C_3H_8$ 1.5%, $N_2$ 0.5%) | |
| Synthesis purged gas | 1,000 kg-mole/hr |
| ($CH_4$ 12.0%, CO 2.5%, $CO_2$ 6.0%, $H_2$ 75.5%, $N_2$ 4.0%) | |
| Steam | 8.885 kg-mole/hr |
| (2) Oxygen gas | |
| Feeding pressure | 53.5 kg/cm$^2$ A |
| Feeding temperature | 200° C. |
| Feeding amount | 1,300 kg-mole/hr |
| ($O_2$ 99.0%, $N_2$ 1.0%) | |

-continued (3) Outlet in steam reforming zone at low temperature
  Pressure: 52.0 kg/cm² A
  Temperature: 670° C.
  Amount of gas: 13,816 kg-mole/hr
  ($CO_2$ 4.54%, CO 1.04%, $H_2$ 22.32%, $CH_4$ 16.47%, $N_2$ 0.38%, $H_2O$ 55.25%)
(4) Outlet of reaction tube
  Pressure: 51.0 kg/cm² A
  Temperature: 927° C.
  Amount of gas: 17,865 kg-mole/hr
  ($CO_2$ 6.65%, CO 8.96%, $H_2$ 39.88%, $CH_4$ 1.44%, $N_2$ 0.37%, $H_2O$ 42.70%)

Gas from the outlet of the reaction tube provided heat to the steam reforming zone at low temperature, and gas in the outlet from the reforming reactor had a pressure of 50.7 kg/cm²A and a temperature of 656° C.

In the reforming reactor, about 20% of material hydrocarbon was reformed in the steam reforming zone at low temperature, and gas at outlet from the reactor showed about 91% of reformation. Thus, a reformed gas suitable for synthesis of methanol was obtained.

EXAMPLE 2

A gas for production of ammonia was produced from natural gas and purged gas from a synthesis apparatus of ammonia by using a hydrocarbon-reforming reactor of this invention. The main condition for operating the reforming reactor were as follows. (The compositions of gases stand for mol %.)

(1) Mixture gas as material
  Feeding pressure: 72.0 kg/cm² A
  Feeding temperature: 550° C.
  Feeding amounts
  Natural gas: 2,300 kg-mole/hr
  ($CH_4$ 89%, $C_2H_6$ 8.5%, $C_3H_8$ 1.5%, $N_2$ 0.5%)
  Synthesis purged gas: 700 kg-mole/hr
  ($CH_4$ 8.5%, $H_2$ 64.5%, $N_2$ 21.5%, Ar 5.5%)
  Steam: 8,621 kg-mole/hr
(2) Oxygen-containing gas (oxygen-rich air)
  Feeding pressure: 71.0 kg/cm² A
  Feeding temperature: 550° C.
  Feeding amount: 3,350 kg-mole/hr
  ($O_2$ 33.0%, $N_2$ 66.2%, Ar 0.80%)
(3) Outlet in steam reforming zone at low temperature
  Pressure: 69.5 kg/cm² A
  Temperature: 670° C.
  Amount of gas: 12,865 kg-mole/hr
  ($CO_2$ 4.04%, CO 0.79%, $H_2$ 20.00%, $CH_4$ 15.47%, $N_2$ 1.26%, Ar 0.30%, $H_2O$ 58.14%)
(4) Outlet of reaction tube
  Pressure: 68.5 kg/cm² A
  Temperature: 908° C.
  Amount of gas: 18,491 kg-mole/hr
  ($CO_2$ 5.93%, CO 6.58%, $H_2$ 32.51%, $CH_4$ 1.62%, $N_2$ 12.87%, Ar 0.35%, $H_2O$ 40.14%)

Gas from the outlet of the reaction tube provided heat to the steam reforming zone at low temperature, and gas in the outlet from the reforming reactor had a pressure of 68.2 kg/cm²A and a temperature of 667° C.

In the reforming reactor, about 22% of material hydrocarbon was reformed in the steam reforming zone at low temperature, and gas at outlet from the reaction tubes showed more than 88% of reformation. Thus, the reformed gas was suitable for synthesis of ammonia.

What we claim is:

1. A reactor for the reforming of hydrocarbons by a steam reforming reaction and a partial oxidation reaction, which comprises:

a reactor shell having a peripheral wall;

an upper tube sheet fixed to said peripheral wall of said reactor shell within an upper portion of said reactor shell, an upper chamber being defined in said reactor shell above said upper tube sheet for holding an oxygen-containing gas therein;

a lower tube sheet fixed to said peripheral wall of said reactor shell below said upper tube sheet, a middle chamber being defined in said reactor shell between said upper and lower tube sheets for holding a mixture gas of hydrocarbon with steam therein, and a lower chamber being defined below said lower tube sheet for heat exchange of a reformed gas;

at least one reaction tube mounted to and extending perpendicularly downwardly from said lower tube sheet into said lower chamber, said at least one reaction tube having an aperture at an upper end portion opening into said middle chamber and having an outlet at a lower end portion into said lower chamber, said outlet being permeable to a reformed gas, and said reaction tube defining a gas flow path from said middle chamber to said lower chamber for passage therethrough of the mixture gas and for carrying out the reforming and partial oxidation reactions of the mixture gas;

an inner tube mounted to said upper tube sheet and extending perpendicularly therefrom and downwardly inside each of said at least one reaction tube, said inner tube having an aperture at an upper end portion opening into said upper chamber and a plurality of holes along a lower end portion, said inner tube having a length within said reaction tube which is smaller than the length of said reaction tube by 10 to 20% so that said lower end portion of said inner tube is spaced apart from said outlet of said reaction tube, and said inner tube defining a gas flow path from said upper chamber into said lower end portion of said reaction tube for feeding of the oxygen-containing gas to said reaction tube;

a catalyst for reforming and oxidation of a mixture gas of hydrocarbon with steam to thereby obtain a reformed gas, said catalyst packed inside each of said at least one reaction tube, filling the space between said reaction tube and said inner tube and filling the space between the lower end portion of said inner tube and said outlet of said reaction tube, said outlet of said at least one reaction tube comprising a catalyst support for supporting said catalyst within said reaction tube, and said catalyst support permitting the reformed gas to pass therethrough;

inlet means for feeding the oxygen-containing gas into said upper chamber;

inlet means for feeding the mixture gas of hydrocarbon and steam into said middle chamber;

outlet means for discharging the reformed gas from said lower chamber; and wherein the upper length of said reaction tube from said upper end portion to said lower end portion proximate to said inner tube holes defines a flow path for carrying out a primary steam reforming reaction of the mixture gas of hydrocarbon with steam, and wherein the lower length of said reaction tube from said lower end portion proximate to said inner tube holes to said catalyst support defines a flow path for carrying out a further reforming reaction and an oxidation reaction of the primary reformed gas.

2. A hydrocarbon-reforming reactor according to claim 1 wherein a burner for start-up is provided in said lower chamber.

3. A hydrocarbon-reforming reactor according to claim 1 wherein the inner peripheral wall of the reactor is provided with a heat-insulating material layer.

4. A hydrocarbon-reforming reactor according to claim 1 wherein the inner peripheral wall of the reactor and at least one of the upper tube sheet and the lower tube sheet are provided with a heat-insulating material layer.

5. A hydrocarbon-reforming reactor according to claim 1 wherein the inner tube is provided with at least one of a heat-resistant, heat-insulating material layer on its outer side and its inner side.

6. A hydrocarbon-reforming reactor according to claim 1 wherein the inner tube and reaction tube are linear.

* * * * *